United States Patent
Chuang

(10) Patent No.: US 10,158,183 B2
(45) Date of Patent: Dec. 18, 2018

(54) METHOD AND STRUCTURE FOR POSITIONING AND WRAPPING WIRE LEADS

(71) Applicant: Dragon Bite Industrial Co., Ltd., Tainan (TW)

(72) Inventor: Li-Jen Chuang, Tainan (TW)

(73) Assignee: Dragon Bite Industrial Co., Ltd., Tainan (TW)

( * ) Notice: Subject to any disclaimer, the term of this patent is extended or adjusted under 35 U.S.C. 154(b) by 0 days.

(21) Appl. No.: 15/854,080

(22) Filed: Dec. 26, 2017

(65) Prior Publication Data

US 2018/0269596 A1  Sep. 20, 2018

(30) Foreign Application Priority Data

Mar. 16, 2017 (TW) ............ 106108740 A

(51) Int. Cl.
  *B23K 20/00* (2006.01)
  *H01R 4/14* (2006.01)
  *H01R 4/66* (2006.01)

(52) U.S. Cl.
  CPC ............ *H01R 4/14* (2013.01); *H01R 4/66* (2013.01)

(58) Field of Classification Search
  CPC ............ B23K 20/004; B23K 1/0016; B23K 2101/36; B21B 15/0085
  USPC ............ 288/4.5, 5.7, 6.2
  See application file for complete search history.

(56) References Cited

U.S. PATENT DOCUMENTS

| | | | | |
|---|---|---|---|---|
| 4,110,903 A | * | 9/1978 | Kless | H01F 41/04 29/605 |
| 9,168,708 B2 | * | 10/2015 | Frantz | B29D 23/001 |
| 2010/0152644 A1 | * | 6/2010 | Pesach | A61N 5/062 604/20 |

* cited by examiner

*Primary Examiner* — Hien Vu
(74) *Attorney, Agent, or Firm* — Alan D. Kamrath; Kamrath IP Lawfirm, P.A.

(57) ABSTRACT

A method and a structure for positioning and wrapping wire leads involve providing two leads of a transmission wire for transmitting power and/or signal with appropriate orientational limit therebetween by: wrapping a predetermined range of the two leads extending from a predetermined object with one or more segments of strip-shaped net for orientational limit that maintain independent extension and juxtaposition of the two leads, so as to prevent the leads of the transmission wire from entwining with each other after frequent orientational change caused by an external force.

6 Claims, 4 Drawing Sheets

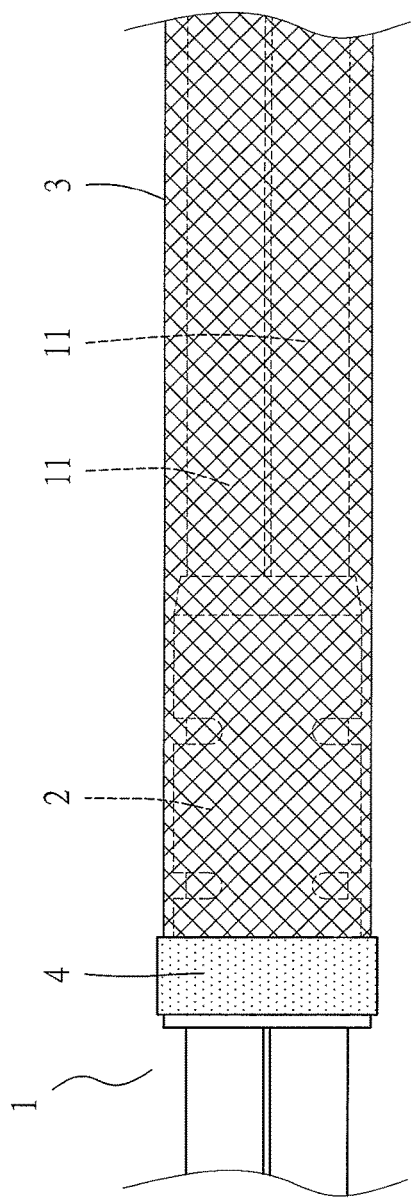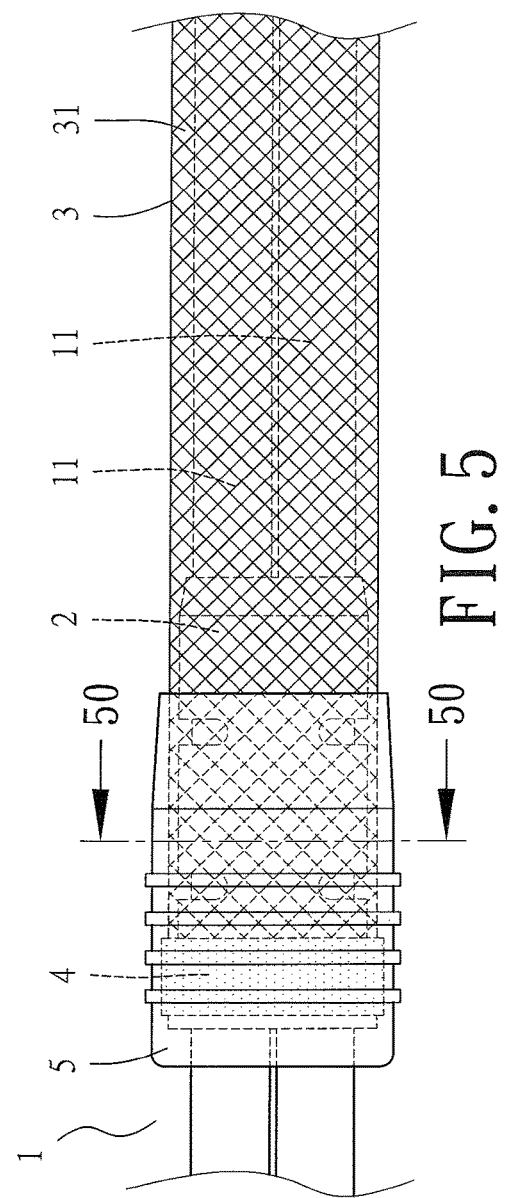

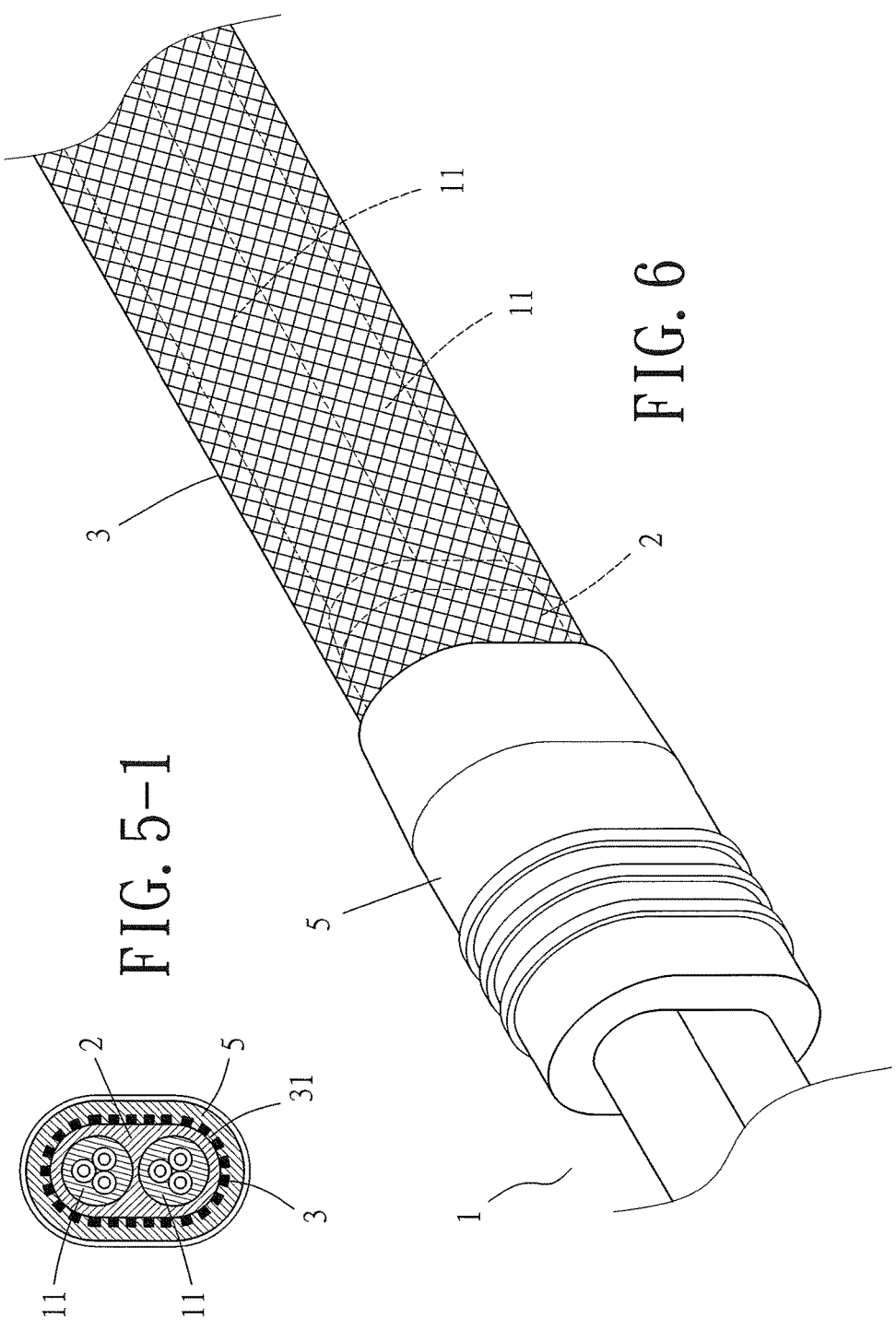

ME THOD AND STRUCTURE FOR POSITIONING AND WRAPPING WIRE LEADS

BACKGROUND OF THE INVENTION

Technical Field

The present invention relates to a method and a structure for positioning and wrapping wire leads, wherein a strip-shaped net is used to wrap a predetermined range of leads of a transmission wire extending from an acting end of a predetermined object, so as to prevent the two leads from entwining with each other when twisted by an external force, thereby ensuring that the transmission wire remain extending untwisted after extended use.

Description of Related Art

Generally, a power and/or signal transmission wire has two leads extending for a predetermined length from an acting end of an object and have their ends provided with terminals that are configured to be inserted into and thereby connect predetermined objects. While such a transmission wire is effective in transmitting power and/or signal, its leads tend to entwine with each other after extended use. For maintain neat and tidy working setting, a user has to untwist the entwined wires and reconnect them to the objects to be connected respectively.

Hence, the inventor of the present invention tries to solve the problem that separate transmission leads of a transmission wire for transmitting power and/or signal tend to entwine with each other after extended use by using a limiting member to wrap a predetermined range of transmission leads extending from an acting end of a predetermined object, so as to prevent the two leads from entwining with each other when twisted by an external force, thereby ensuring that the transmission wire remain extending untwisted after extended use.

BRIEF SUMMARY OF THE INVENTION

To address the problem that separate transmission leads of a transmission wire for transmitting power and/or signal tend to entwine with each other when twisted by an external force, the present invention has a predetermined range of two leads extending from a predetermined object wrapped by one or more segments of strip-shaped net for orientational limit that maintain independent extension and juxtaposition of the two leads, so as to prevent the leads of the transmission wire from entwining with each other after frequent orientational change caused by an external force.

A primary objective of the present invention is to provide a method for positioning and wrapping wire leads in order to maintain an appropriate orientational limit between two leads of a transmission wire for transmitting power or signals, the method comprising: wrapping predetermined segments of two leads extending from a predetermined object with one or more segments of a limiting medium by means of in-mold injection wrapping, so as to provide orientational constraint on the two leads and limit them in a respectively small range; wrapping the limiting medium and outer peripheries of the two adjacent leads with one or more segments of a predetermined length of a strip-shaped net; adhering an adhesive tape to a start end of the strip-shaped net wrapping an outer periphery of the limiting medium so as to provide orientational constraint to the start end of the strip-shaped net; placing the limiting medium on the two leads extending from the predetermined object that is wrapped by the strip-shaped net into a mold; and molding a limiting member into a predetermined form to provide the strip-shaped net on the limiting medium with orientational constraint by means of in-mold injection wrapping, thereby allowing the limiting member to permeate into the limiting medium through holes in the strip-shaped net and integrating the limiting member and the limiting medium as a unity to provide orientational constraint to one end of the strip-shaped net, thereby allowing the two leads extending from the predetermined object to maintain orientational limit therebetween in a predetermined range, and preventing them from entwining with each other.

Another objective of the present invention is to provide a structure for positioning and wrapping wire leads in order to maintain an appropriate orientational limit between two leads of a transmission wire for transmitting power or signals, the structure comprising: one or more segments of a limiting medium wrapping predetermined segments of two leads extending from a predetermined object by means of in-mold injection wrapping; one or more segments of a predetermined length of a strip-shaped net wrapping the limiting medium and a predetermined range of outer peripheries of the two adjacent leads; an adhesive tape adhered to one end of the strip-shaped net wrapping the limiting medium for providing preliminary constraint to the strip-shaped net; and a limiting member of a predetermined form wrapping the strip-shaped net that wraps an outer periphery of the limiting medium by means of in-mold injection wrapping, so as to provide orientational constraint to the strip-shaped net wrapping the limiting medium that wraps the predetermined range of the two adjacent leads, thereby allowing the two leads extending from the predetermined object to maintain orientational limit therebetween in a predetermined range, and preventing them from entwining with each other.

BRIEF DESCRIPTION OF THE SEVERAL VIEWS OF THE DRAWINGS

FIG. 4 is a schematic drawing showing the transmission lead wire of FIG. 3, wherein the limiting medium at its end wrapped by the strip-shaped net further wrapped by an adhesive tape.

FIG. 5 is a schematic drawing showing the transmission lead wire of FIG. 4 further wrapped by a limiting member at the limiting medium wrapped by the strip-shaped net.

FIG. 5-1 is a cross-sectional view of FIG. 5 taken along Line 50-50.

FIG. 6 is a perspective view of a transmission lead wire wrapped by a strip-shaped net in a predetermined range according to the present invention.

DETAILED DESCRIPTION OF THE INVENTION

Figure 1:
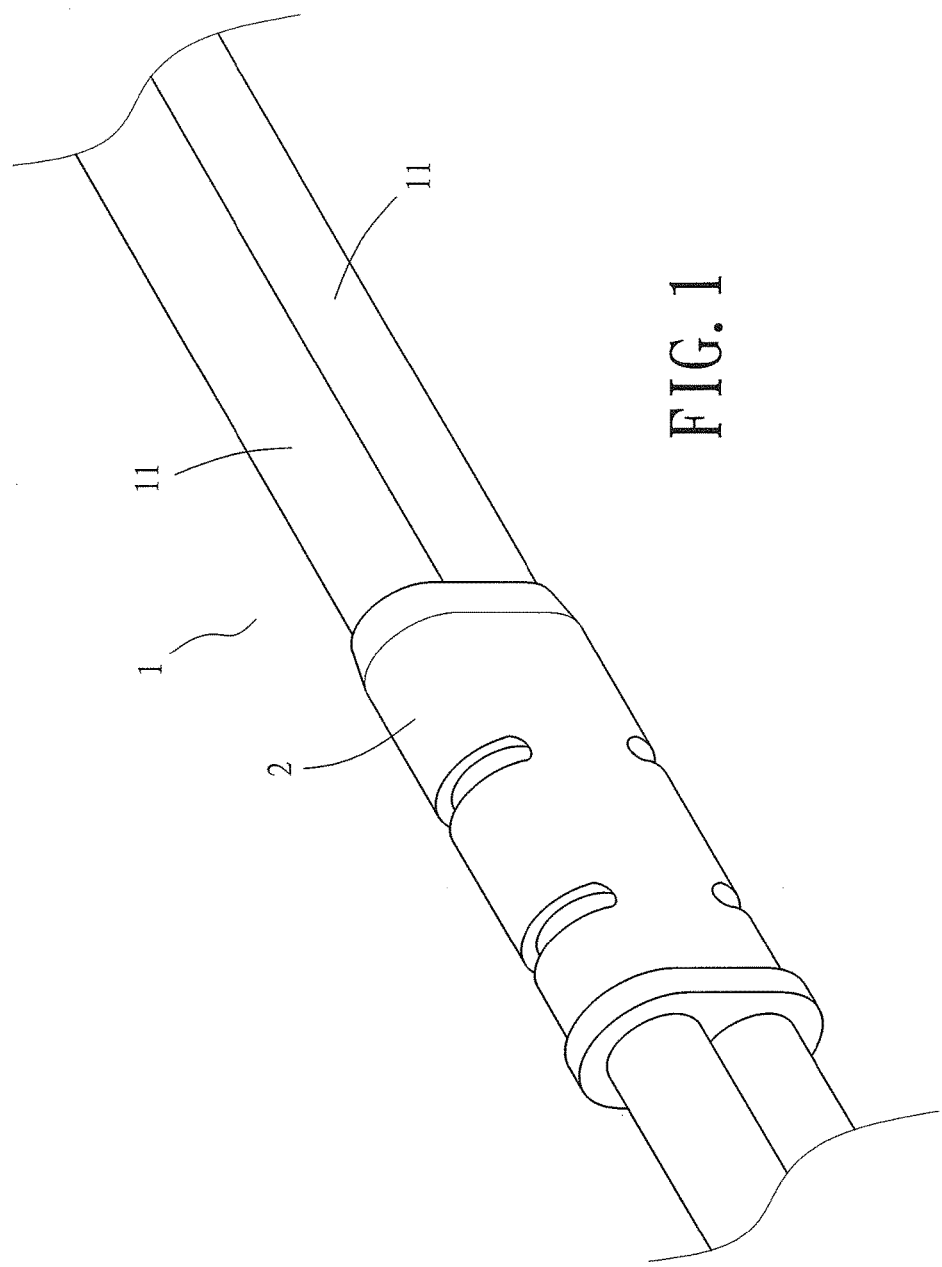
FIG. 1 is a perspective view of a transmission lead wire having a limiting medium combined therewith in a predetermined range according to the present invention.
Figure 2:
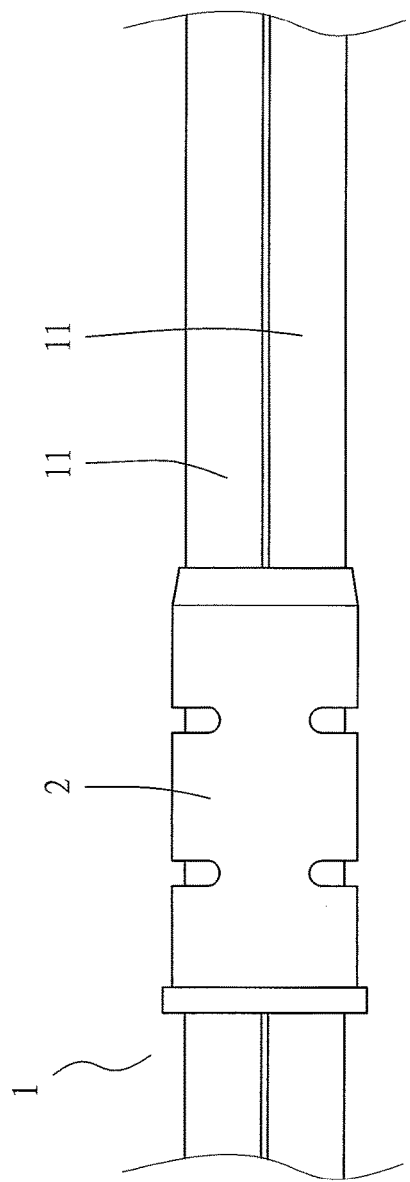
FIG. 2 is a plane view of the transmission lead wire of FIG. 1.
Figure 3:
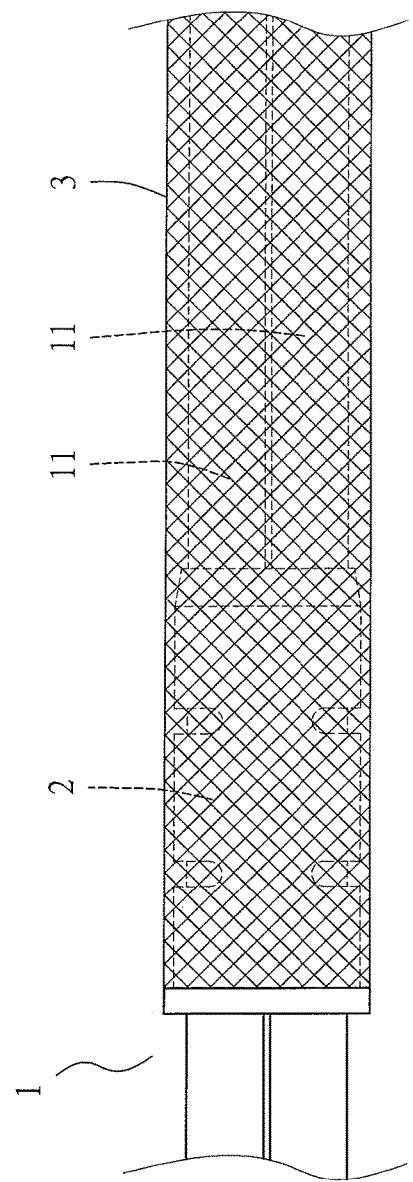
FIG. 3 is a schematic drawing showing the transmission lead wire further wrapped by a predetermined length of a strip-shaped net in a predetermined range according to the present invention.

According to the present invention, a method for positioning and wrapping wire leads (as shown in FIG. 1 and FIG. 2) is to maintain an appropriate orientational limit between two leads 11 of a transmission wire 1 for transmitting power or signals. The method comprises: wrapping predetermined segments of two leads 11 extending from a predetermined object with one or more segments of a limiting medium 2 by means of in-mold injection wrapping, so as to provide orientational constraint on the two leads 11 and limit them in a respectively small range; wrapping the limiting medium 2 and outer peripheries of the two adjacent leads 11 with one or more segments of a predetermined length of a strip-shaped net 3 (as shown in FIG. 3); adhering an adhesive tape 4 or the like to a start end of the strip-shaped net 3 wrapping an outer periphery of the limiting medium 2 so as to provide orientational constraint to the start end of the strip-shaped net 3 (as shown in FIG. 4); placing the limiting medium 2 on the two leads 11 extending from the predetermined object that is wrapped by the strip-shaped net 3 into a mold (not shown); and molding a limiting member 5 into a predetermined form to provide the strip-shaped net 3 on the limiting medium 2 with orientational constraint (as shown in FIG. 5) by means of in-mold injection wrapping, thereby allowing the limiting member 5 to permeate into the limiting medium 2 through holes 31 in the strip-shaped net 3 (as shown in FIG. 5-1) and integrating the limiting member 5 and the limiting medium 2 as a unity to provide orientational constraint to one end of the strip-shaped net 3, thereby allowing the two leads 11 extending from the predetermined object to maintain orientational limit therebetween in a predetermined range (as shown in FIG. 6), and preventing them from entwining with each other.

Using the foregoing method, a structure for positioning and wrapping wire leads in order to maintain an appropriate orientational limit (as shown in FIG. 5 and FIG. 6) between two leads 11 of a transmission wire 1 for transmitting power or signals comprises: one or more segments of a limiting medium 2 wrapping predetermined segments of the two leads 11 extending from a predetermined object by means of in-mold injection wrapping; one or more segments of a predetermined length of a strip-shaped net 3 wrapping the limiting medium 2 and a predetermined range of outer peripheries of the two adjacent leads 11; an adhesive tape 4 or the like adhered to one end of the strip-shaped net 3 wrapping the limiting medium for providing preliminary constraint to the strip-shaped net 3; and a limiting member 5 of a predetermined form wrapping the strip-shaped net 3 that wraps an outer periphery of the limiting medium 2 by means of in-mold injection wrapping, so as to provide orientational constraint to the strip-shaped net 3 wrapping the limiting medium 2 that wraps the predetermined range of the two adjacent leads 11, thereby allowing the two leads 11 extending from the predetermined object to maintain orientational limit therebetween in a predetermined range, and preventing them from entwining with each other.

In the foregoing construction, the limiting medium 2 attached to the predetermined segments of the two leads 11 and the limiting member 5 at the adjacent outer periphery are made of an identical material.

Alternatively, in the foregoing construction, the limiting medium 2 attached to the predetermined segments of the two leads 11 and the limiting member 5 at the adjacent outer periphery are made of compatible materials.

Alternatively, in the foregoing construction, the leads 11 extending from the predetermined object and wrapped in the predetermined segment by the limiting medium 2 and the limiting member 5 are more than two leads 11.

What is claimed is:

1. A method for positioning and wrapping wire leads in order to maintain an appropriate orientational limit between two leads of a transmission wire for transmitting power or signals, the method comprising: wrapping predetermined segments of the two leads extending from a predetermined object with one or more segments of a limiting medium by means of in-mold injection wrapping, so as to provide orientational constraint on the two leads and limit them in a respectively small range; wrapping the limiting medium and the two adjacent leads with one or more segments of a predetermined length of a strip-shaped net; adhering an adhesive tape to a start end of the strip-shaped net wrapping the limiting medium so as to provide orientational constraint to the start end of the strip-shaped net; placing the limiting medium on the two leads extending from the predetermined object that is wrapped by the strip-shaped net into a mold; and molding a limiting member into a predetermined form to provide the strip-shaped net on the limiting medium with orientational constraint by means of in-mold injection wrapping, thereby allowing the limiting member to permeate into the limiting medium through holes in the strip-shaped net and integrating the limiting member and the limiting medium as a unity to provide orientational constraint to the end of the strip-shaped net, thereby allowing the two leads extending from the predetermined object to maintain orientational limit therebetween in a predetermined range, and preventing them from entwining with each other.

2. The method of claim 1, wherein the limiting medium and the limiting member are made of an identical material.

3. The method of claim 1, wherein the limiting medium and the limiting member are made of compatible materials.

4. The method of claim 1, wherein the two leads include two or more said leads.

5. A structure for positioning and wrapping wire leads in order to maintain an appropriate orientational limit between two leads of a transmission wire for transmitting power or signals, the structure comprising: one or more segments of a limiting medium wrapping predetermined segments of the two leads extending from a predetermined object by means of in-mold injection wrapping; one or more segments of a predetermined length of a strip-shaped net wrapping the limiting medium and a predetermined range of the two adjacent leads; an adhesive tape adhered to the end of the strip-shaped net wrapping the limiting medium for providing preliminary constraint to the strip-shaped net; and a limiting member of a predetermined form wrapping the strip-shaped net that wraps the limiting medium by means of in-mold injection wrapping, so as to provide orientational constraint to the strip-shaped net wrapping the limiting medium that wraps the predetermined range of the two adjacent leads, thereby allowing the two leads extending from the predetermined object to maintain orientational limit therebetween in a predetermined range, and preventing them from entwining with each other.

6. The structure of claim 5, wherein the two leads include two or more said leads.

* * * * *